United States Patent [19]

Hattori

[11] Patent Number: 4,553,301

[45] Date of Patent: Nov. 19, 1985

[54] THREADEDLY FIXING APPARATUS

[75] Inventor: Seiji Hattori, Nagoya, Japan

[73] Assignee: Daidotokushuko Kabushikikaisha, Japan

[21] Appl. No.: 607,059

[22] Filed: May 4, 1984

[30] Foreign Application Priority Data

May 4, 1983 [JP] Japan .................................. 58-78755
Dec. 29, 1983 [JP] Japan ............................. 58-248258

[51] Int. Cl.⁴ ............................................. B23P 19/00
[52] U.S. Cl. ......................................... 29/237; 29/240
[58] Field of Search ........................ 33/174 E, 199 R; 29/237, 240, 281.4, 281.5; 269/43; 81/57.33

[56] References Cited

U.S. PATENT DOCUMENTS

| | | | |
|---|---|---|---|
| 2,622,336 | 12/1952 | Raout | 33/199 R |
| 2,680,301 | 6/1954 | Steczynski | 33/199 R |
| 2,880,518 | 4/1959 | Settele | 33/99 R |
| 3,766,632 | 10/1973 | Goeke | 29/240 |

Primary Examiner—Robert C. Watson
Attorney, Agent, or Firm—William A. Drucker

[57] ABSTRACT

Disclosed is an apparatus for threadedly fitting a buttress tapered external thread portion and a buttress tapered internal thread portion each other. A detecting internal thread portion provided on the gauge is threadedly fitted into the buttress tapered external thread portion, and the buttress tapered internal thread portion is threadedly fitted into a detecting external thread portion provided on the gauge. As a consequence, a helical locus position of the tapered external thread portion and a helical locus position of the tapered internal thread portion are detected. Next, after the gauge has been removed and in the state wherein the thus detected helical locus positions are put in order each other, the tapered external thread portion and the tapered internal thread portion are relatively turned whereby these tapered external thread portion and tapered internal thread portion are threadedly fitted each other.

5 Claims, 20 Drawing Figures

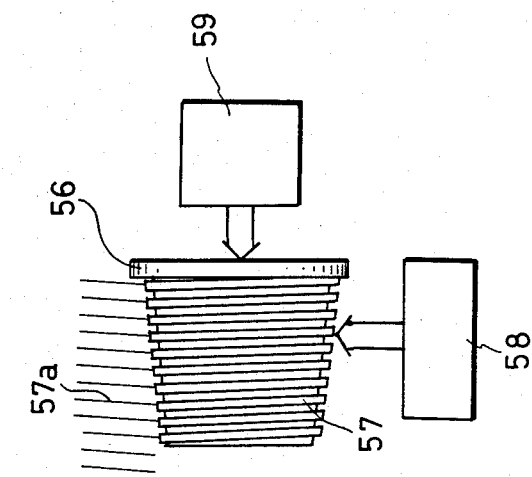
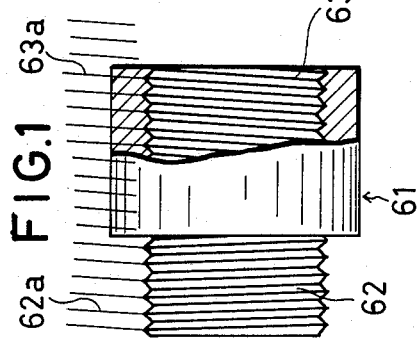
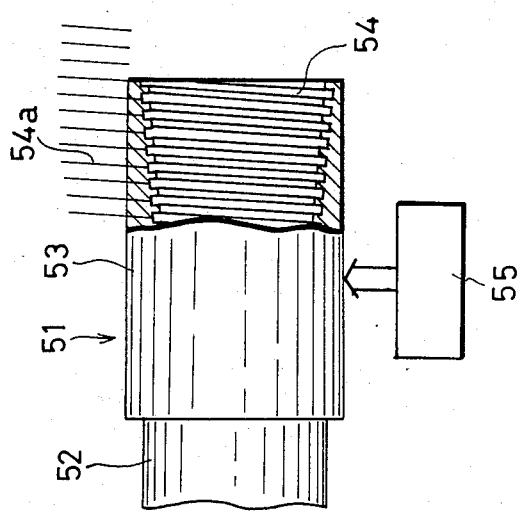
FIG.1
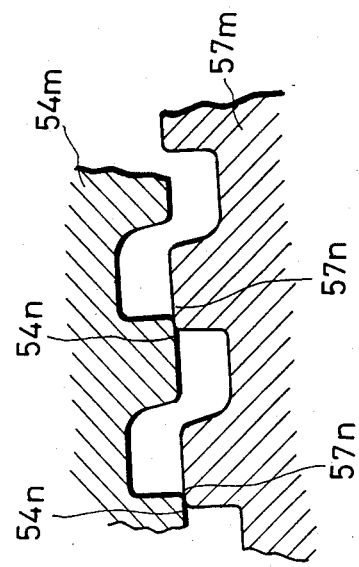
FIG.20
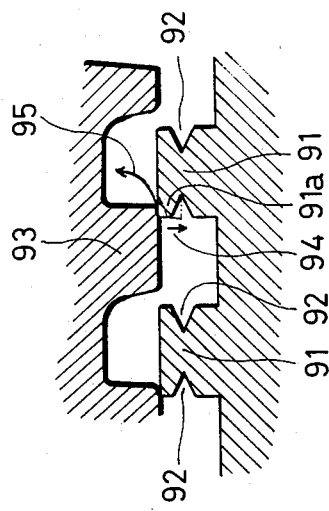
FIG.17

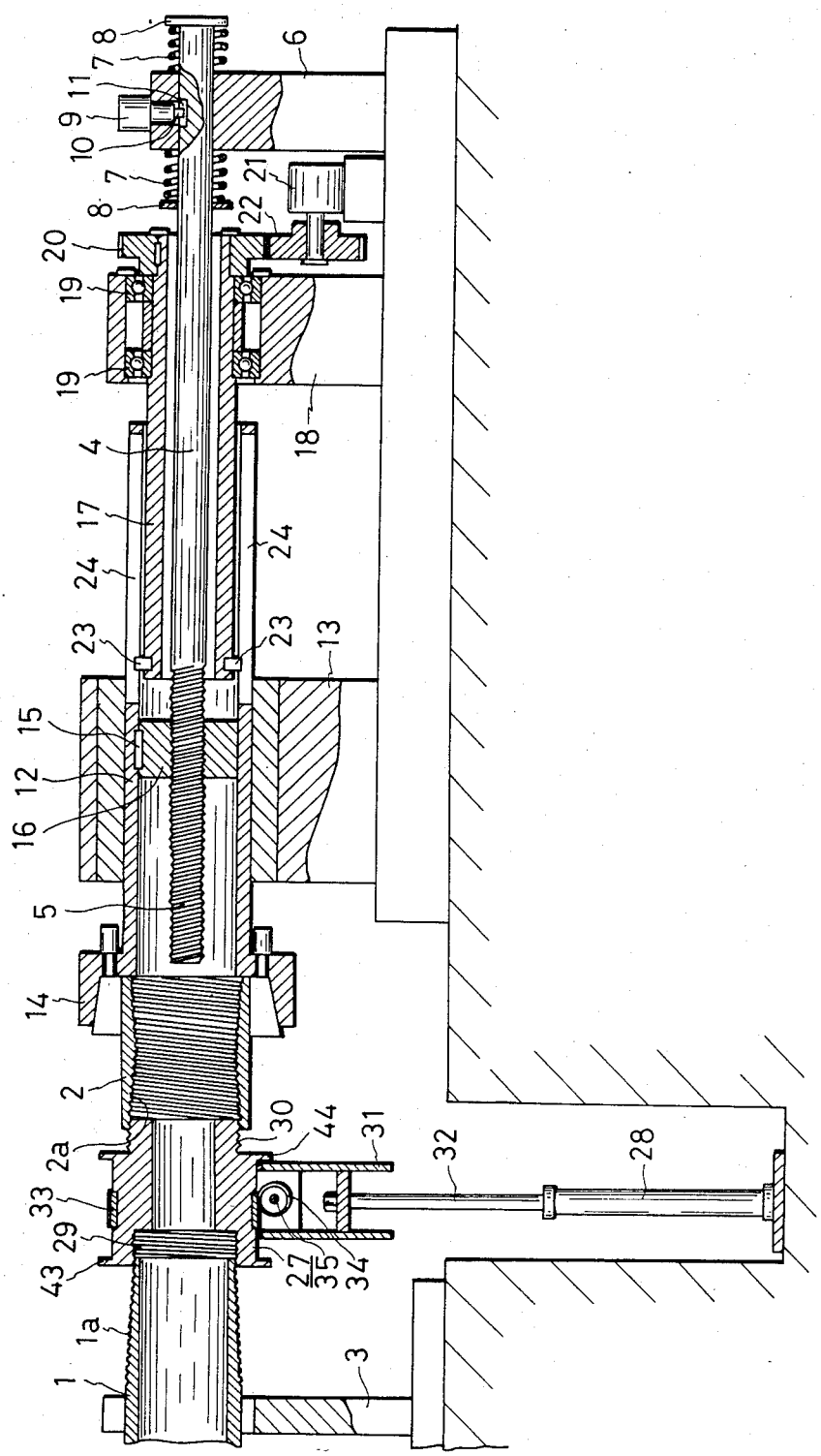

4,553,301

THREADEDLY FIXING APPARATUS

BACKGROUND OF THE INVENTION

1. Field of the Invention

This invention relates to a threadedly fixing apparatus which is used to threadedly mount a connecting coupling on one end of a relatively large diameter pipe such as oil well pipes for boring petroleum, pipes used for various civil engineering works and the like, or which is used to threadedly mount a protector on the coupling.

2. Description of the Prior Art

Such a pipe as described above is machined in factories so that external threads are cut on opposite ends thereof, after which a protector for protecting the external threads is threadedly mounted on one end thereof and one end of a connecting coupling is threadedly mounted on the other end. A protector for protecting internal threads is threadedly mounted on the other end of the coupling. The thus processed pipes are supplied to the site for use. Incidentally, the aforesaid external threads cut on the pipe and the internal threads of the coupling to be threadedly fitted therein are all buttress tapered threads. One reason is that in the state where one pipe is connected to the other by use of a coupling, it is possible to transmit a great turning force from one pipe to the other. Another reason is that in the above-described connected state, good sealing properties between inside and outside of the pipe are maintained. Since the buttress tapered threads are used as the external threads of the pipe and as the internal threads of the coupling as described above, similar buttress tapered threads are also used for the protector for protecting these threads. However, the above-described buttress tapered threads pose a problem. That is, threadedly fitting work between the buttress tapered external threads and buttress tapered internal threads is very difficult. This will be explained. Threadedly fitting between the tapered external threads and tapered internal threads is carried out in the following process. First, an external thread 57m is positioned inside an internal thread 54m as shown in FIG. 20. Next, both the threads are threadedly fitted by relative rotation of both the threads. In this case, all of a number of threads of one thread have to be simultaneously fitted into a number of thread grooves of the other. To this end, the relative positions between the aforesaid number of threads and the number of thread grooves have to be placed in coincidence with each other accurately. It is very difficult to accurately position them so as to threadedly fitting both the threads, as described above. If the aforesaid relative position is slightly deviated as shown in FIG. 20, the number of threads 54n of one thread and the number of threads 57n of the other become bit at their respective crests when both the threads are relatively rotated. If such biting should occur, the number of threads are broken or damaged when it is removed. As a result, there gives rise to problems in that the ability for transmission of the turning force is declined and the sealing properties are deteriorated, as previously mentioned.

SUMMARY OF THE INVENTION

It is therefore a first object of the present invention to provide a threadedly fixing apparatus which can threadedly fit buttress tapered external threads and buttress tapered internal threads.

It is a second object of the present invention to provide a threadedly fixing apparatus wherein in case of the aforesaid threadedly fitting, the relative positional relation between threads of one out of the tapered external threads and tapered internal threads and thread grooves of the other can be properly positioned in advance, and the tapered external threads and tapered internal threads can be threadedly fitted without producing a bite between the threads That is, in the apparatus of the present invention, a gauge is used to detect a helical locus position of the tapered external threads and a helical locus position of the tapered internal threads. Then, the tapered external threads and tapered internal threads are threadedly fitted in the state wherein these detected helical locus positions are put in order each other. Accordingly, threadedly fitting of both the threads may be carried out smoothly.

Other objects and advantages of the invention will become apparent during the following discussion of the accompanying drawings.

BRIEF DESCRIPTION OF THE DRAWINGS

FIG. 1 is a constructional view showing the principle of a threadedly fixing apparatus;

FIG. 5 is a longitudinal sectional side view showing the operating state of FIG. 2;

FIG. 17 is a sectional view showing an example in which contour of threads in the gauge is different;

FIG. 20 is a view for explaining a bite between threads.

DESCRIPTION OF THE PREFERRED EMBODIMENTS

Figure 2:
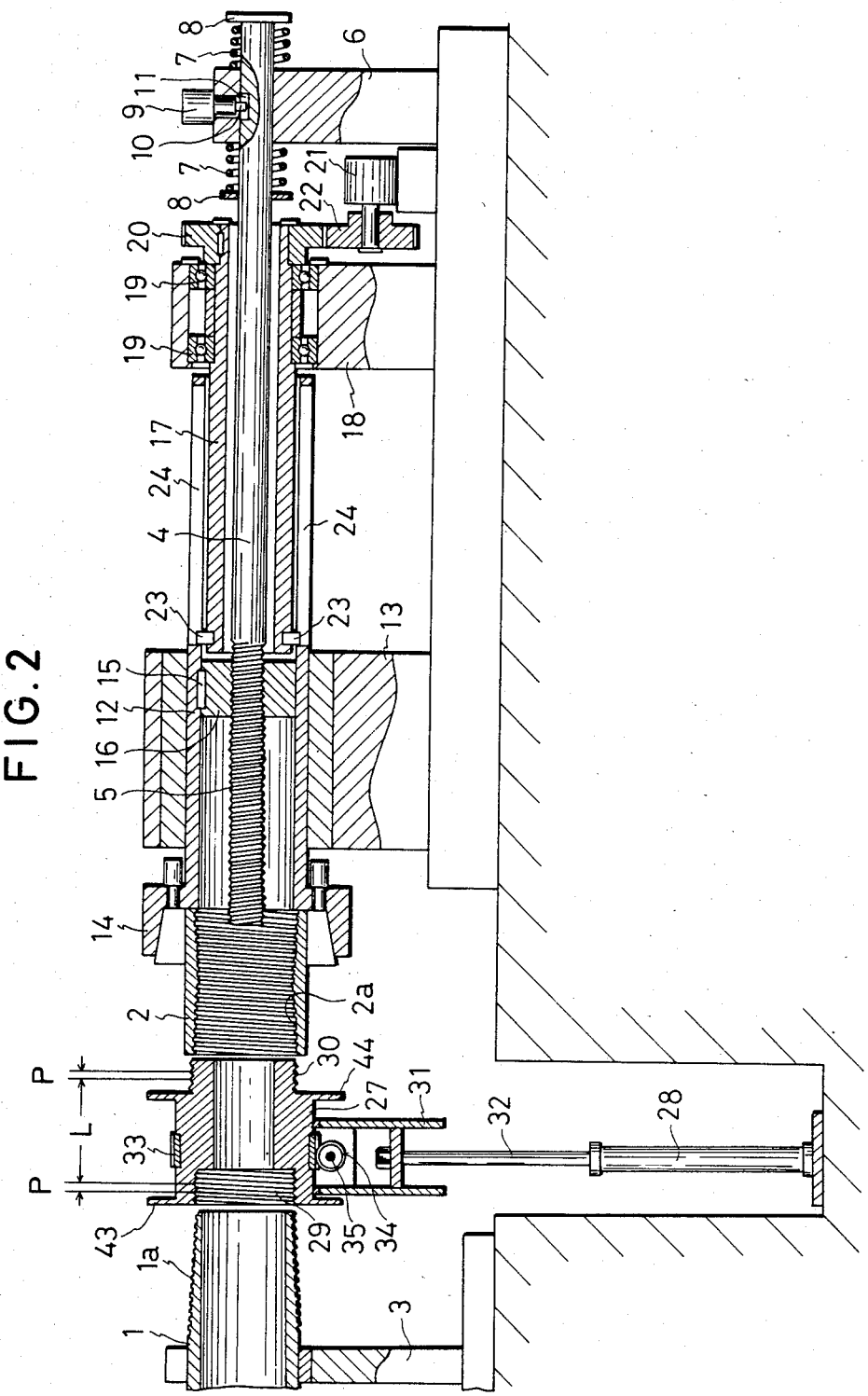
FIG. 2 is a longitudinally sectional side view showing one specific construction of the threadedly fixing apparatus.
Figure 3:
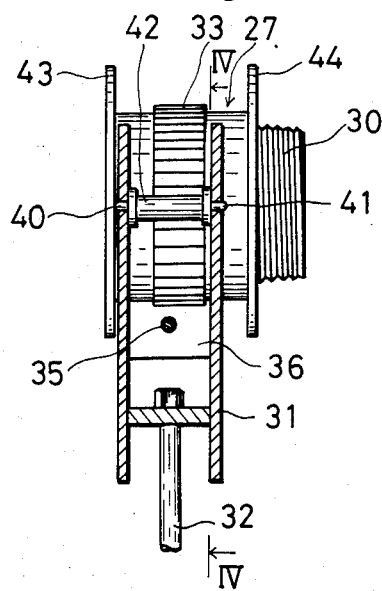
FIG. 3 is a side view of a gauge.
Figure 4:
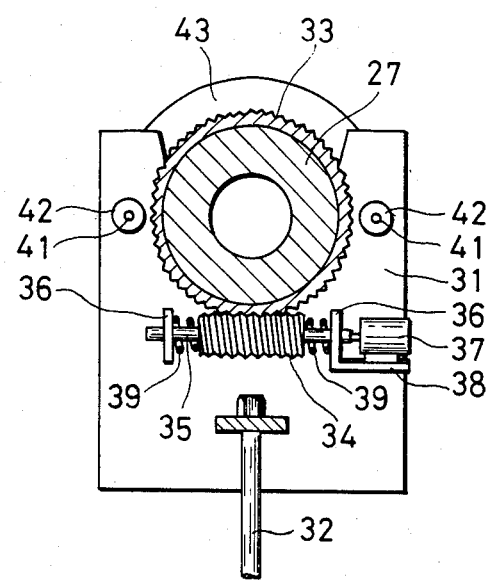
FIG. 4 is a sectional view taken on line IV—IV of FIG. 3.

In FIG. 1 which shows the construction, in principle, of the threadedly fixing apparatus, a first member 51 includes a hollow oil well pipe 52 and a coupling 53 threadedly mounted on one end thereof. The coupling 53 has its internal surface formed with a buttress tapered internal thread portion 54. The first member 51 is fixedly retained by a retaining means 55. On the other hand, a second member 56 comprises, as one example, a protector to be screwed into the coupling 53. This protector 56 has its outer circumferential surface formed with a buttress tapered external thread portion 57. The second member 56 is retained by a retaining means 58, is moved closer to the first member 51 by a threadedly mounting means 59, and is rotated around its own axis. The threadedly fixing apparatus includes a gauge 61. This gauge has a detecting external thread portion 62 and a detecting internal thread portion 63. The external thread portion 62 is provided to measure a helical locus position 54a of the tapered internal thread portion 54 and has the diameter and the same pitch capable of being threadedly fitted therein. The detecting internal thread portion 63 is provided to measure a helical locus position 57a of the external thread portion 57 and has the inside diameter and the same pitch capable of being threadedly fitted. Both the external thread portion 62 and internal thread portion 63 use triangular threads so that they may easily threadedly fit in the internal thread portion 54 and external thread portion 57, respectively. The helical locus position termed hereinabove refers to the position where the helical locus of each thread portion is present. Also, the helical locus termed hereinabove refers to the following. That is, in the internal thread portion, where the internal thread portion is rotated with the pitch thereof while rotating the same, the locus depicted by the thread groove is called the helical locus. In the external thread portion, the locus depicted by the thread is called the helical locus.

Next, the operation for threadedly fitting the internal thread portion 54 of the first member 51 and the external thread portion 57 of the second member 56 by use of the above-described apparatus will be described.

First, the operation for the case where the helical locus position 62a of the external thread portion 62 and helical locus position 63a of the internal thread portion 63 are in coincidence with each other will be described. First, the detecting external thread portion 62 is threadedly fitted in the internal thread portion 54. This operation can be carried out by manually holding the gauge 61. Alternatively, the gauge 61 is retained by a retaining means for retaining it in the state wherein the gauge may be rotated freely around an axis thereof, and under that state, the guage 61 is moved towards the first member 51 while rotating the former. In case of this threadedly fitting, since the external thread portion 62 has the triangular threads as previously mentioned, engagement between the crest of the internal thread portion 54 and the thread of the external thread portion rarely occurs. Thus, the above-described threadedly fitting may be easily carried out. Subsequently, the external thread portion 57 is threadedly fitted in the detecting internal thread portion 63. This operation is carried out by moving the second member 56 towards the gauge 61 while rotating the former by the threadedly mounting means 59. Threadedly fitting in this case may be carried out easily likewise the previous case. By the operation as described above, in the state wherein the detecting external thread portion 62 is threadedly fitted in the internal thread portion 54 and the external thread portion 57 is threadedly fitted in the detecting internal thread portion 63, the helical locus position 54a of the internal thread portion 54 and helical locus position 57a of the external thread portion 57 are in the state wherein they are put in order.

Next, the second member 56 is disengaged from the gauge 61 while rotating the second member 56 in a direction opposite to the above-described direction by the threadedly mounting means 59. In this case, rotation of the second member 56 and withdrawal thereof to right as viewed in the figure are carried out with the pitch equal to that of the external thread portion 57. By doing this, even after disengagement, the helical locus position 54a of the internal thread portion 54 and helical locus position 57a of the external thread portion 57 are in the state wherein they are put in order. Thereafter, the gauge 61 is disengaged from the first member 51.

Next, the second member 56 is moved forward towards the first member 51 with the pitch equal to that of the external thread portion 57 while rotating the second member by the threadedly mounting means 59. Then, when the external thread portion 57 is about to enter into the internal thread portion 54, the thread of the external thread portion 57 is exactly opposed to the thread groove of the internal thread portion 54. Accordingly, by proceeding rotation and forward movement of the second member 56 under said state, the external thread portion 57 properly threadedly fits in the internal thread portion 54. That is, the thread of the external thread portion 57 and thread of the internal thread portion 54 will not collide with each other.

By the above-described operation, threadedly mounting work of the second member 56 to the first member 51 is completed.

It will be noted that where the first member 51, the gauge 61 and the second member 56 are moved away from one another, the gauge 61 can be first moved away from the first member 51 and thereafter the gauge 61 moved away from the second member 56.

The operation for threadedly fitting the second member 56 into the first member 51 can be carried out as follows: That is, first, the second member 56 is moved in an axial direction without rotating the same, and the end of the external thread portion 57 is brought to assume the state wherein it faces to an inlet of the internal thread portion 54. In this case, the moving distance thereof is made an integral fold of pitch of the external thread portion 57. Even after such a movement, the helical locus position 57a and helical locus position 54a are put in order. Thereafter, the second member 56 is moved forward while rotating the same similarly to the afore-mentioned case. Thereby, the external thread portion 57 may be threadedly fitted into the internal thread portion 54 smoothly.

Next, the operation for the case where the helical locus position 62a of the external thread portion 62 and helical locus position 63a of the internal thread portion 63 are not put in order will be illustrated. First, the work for threadedly fitting the first member 51, the gauge 61 and the second member 56 with one another and work for separating them from one another are carried out in the same manner as that of the first-mentioned case. Thereafter, the second member 56 is moved in an axial direction by a portion corresponding to a deviation between the helical locus position 62a and helical locus position 63a. By this operation, the helical locus position 54a and helical locus position 57a will be put in order. Thereafter, the external thread portion 57 is threadedly fitted into the internal thread portion 54 by the operation similar to the first-mentioned case. It will be noted that the above-described work for correction of the deviation can be carried out by rotating the second member 56 through a small angle (an angle corresponding to the deviation between the helical locus positions 62a and 63a) on the spot without moving the second member 56 in the axial direction. Moreover, such an operation can be done after the second member 56 has been moved closer to the first member 51.

Next, the detecting external thread portion 62 and detecting internal thread portion 63 in the gauge 61 are preferably those which can easily be threadedly fitted with respect to the buttress tapered internal thread portion and tapered external thread portion, respectively. Threads for that purpose include those as follows:

(A) That the dimension of width (axial dimension) of a crest of a thread is smaller than that of a crest of a thread in a buttress tapered thread, as in a triangular thread and a round thread.

(B) That a thread is formed of a material which is good in surface slide such as fluorine plastics, polyacetal plastics, etc.

(C) That a thread has elasticity and flexibility. When the thread is about to be entered into a buttress thread groove, it is entered therein while being flexed, and as the thread deeply enters, it is elastically restored (see FIG. 17 later described).

A combination of the above-described (A) and (B) or a combination of (B) and (C) can also be used.

Next, the relative threadedly fitting between the first member 51 and the second member 56 will suffice. Thus, the threadedly mounting means is attached to the first member 51 and the first member 51 can be moved towards the second member 56 while rotating the first member 51. Alternatively, the threadedly mounting means is attached to both the first member and second member, and both the members can be moved closer to each other while rotating both the members.

Next, one example of a specific construction of the threadedly fixing apparatus will be explained with reference to FIGS. 2 to 5. An oil well pipe 1 which comprises a first member is formed at an end thereof with a buttress tapered external thread portion 1a. The first member 1 is fixedly supported by a retaining bed 3. On the other hand, a second member 2 is herein shown as a coupling which is threadedly fitted with respect to the first member. The coupling 2 is formed in its internal circumferential surface with a buttress tapered internal thread portion 2a. Next, the threadedly mounting means for the coupling 2 will be explained. A lead screw shaft 4 has thread grooves 5 which have a pitch equal to that of the tapered thread portions 1a and 2a. The lead screw shaft 4 is supported at one end thereof by a support bed 6. In said supporting state, the lead screw shaft 4 is axially movable. The lead screw shaft 4 has flanges 8, 8 secured thereto, and coiled springs 7, 7 are interposed between the flanges 8, 8 and the support bed 6. A solenoid 9 mounted on the support bed 6 has its operating frame 10 loosely fitted into a slot 11 formed in the lead screw shaft 4. Thereby, the lead screw shaft 4 can be moved axially as described above but cannot be rotated. A cylindrical member 12 is supported by a receiving bed 13 rotatably and axially movably forward and backward. At the end of the cylindrical member 12 is provided a retaining member for retaining the second member 2. As one example of the retaining means, a chuck 14 is herein used. An internal thread member 16 fixedly mounted by means of a key 15 within the cylindrical member 12 is threadedly fitted with the thread grooves 5 of the lead screw shaft 4. The lead screw shaft 4 is externally provided with a transmission cylindrical member 17 which is coaxial with the lead screw shaft 4 and cylindrical member 12. This transmission cylindrical member 17 is rotatably supported on a receiving bed 18 through roller bearings 19. A gear 20 is mounted on one end of the transmission cylindrical member 17, the gear 20 being engaged with a gear 22 mounted on a rotary shaft of a motor 21 used as a driving means. On the other hand, on the other end of the transmission cylindrical member 17 are mounted engaging pieces 23 to be positioned in the external circumference thereof. The engaging pieces 23 are loosely fitted into axial slits 24 formed in the cylindrical member 12.

Next, a gauge 27 is positioned between the first member 1 and the second member 2. The gauge 27 has a detecting internal thread portion 29 to be threadedly fitted in an external thread portion 1a of the first member and a detecting external thread portion 30 to be threadedly fitted in an internal threaded portion 2a of the second member. These internal thread portion 29 and external thread portion 30 are formed into traiangular threads, respectively, so that they may be easily threadedly fitted with respect to their mating buttress threads. The internal thread portion 29 and external thread portion 30 are the same in pitch P, and a spacing L therebetween is an integral fold of the pitch P. The gauge 27 is supported movably up and down by a lift 28. A retaining frame 31 is mounted on a piston rod 32 of the lift 28, and the gauge 27 sits on the retaining frame 31. The gauge 27 is rotatable around its own axis and movable in an axial direction in the state wherein it sits on the retaining frame 31. As the lift 28, a hydraulic cylinder, for example, can be used. Next, the rotating means for the gauge 27 will be explained. A worm wheel 33 is fixedly mounted in the outer circumference of the gauge 27. On the other hand, bearings 36, 36 are mounted on the retaining frame 31. A transmission shaft 35 is rotatably and axially movably supported by the bearings 36, 36. A worm 34 is mounted on the transmission shaft 35 and the worm 34 is engaged with the wheel 33. A motor 37 is connected to one end of the transmission shaft 35. This motor 37 is mounted on a mounting bed 38 secured to the retaining frame 31. The motor is mounted in such a way that the motor 37 is retractable axially of the transmission shaft 35. A coiled spring 39 is interposed between the bearings 36, 36 and the worm 34. As a result, in the normal state, the worm 34 is positioned midway both the bearings 36 and 36. Next, a movement control mechanism for moving the guage 27 in an axial direction will be explained. A cylinder 42 is mounted on the retaining frame 31. This cylinder 42 has rods 40 and 41 at one end and the other end, respectively, thereof. The rods 40 and 41 individually appear from the cylinder 42. On the other hand, the gauge 27 is provided with flanges 43 and 44. The rods 40 and 41 are opposed to the flanges 43 and 44, respectively.

Figure 6:
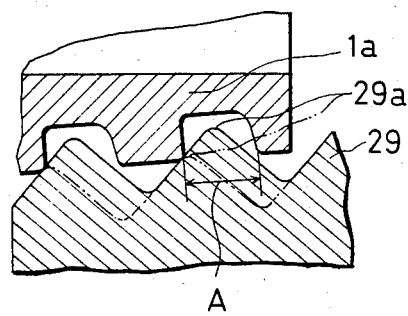
FIG. 6 is an enlarged sectional view showing the threadedly fitted state between an external thread portion of a pipe and an internal thread portion of a gauge.

Next, the operation for threadedly fitting the tapered internal thread portion 2a of the second member 2 into the tapered external thread portion 1a of the first member by use of the above-described apparatus will be explained. First, the internal thread portion 29 of the gauge 27 is threadedly fitted into the external thread portion 1a of the first member 1 in a manner as will be described hereinafter. First, the cylinder 42 is actuated to slowly move forward the rod 40. Then, the flange 43 is pushed by the rod 40 and the gauge 27 is moved towards the first member 1. Simultaneously, the motor 37 is actuated to rotate the gauge 27 through the worm 34 and worm wheel 33. By carrying out the operation as described above, the end of the internal thread portion 29 comes to face to the end of the external thread portion 1a. The gauge 27 is further continued for its forward movement and rotation whereby the internal thread portion 29 threadedly fits into the external thread portion 1a. In this case, even if the helical locus position of the external thread portion 1a and the helical locus position of the internal thread portion 29 are not properly put in order and there is present a slight deviation therebetween, the aforesaid threadedly fitting is smoothly effected. That is, the internal thread portion 29 is the triangular thread, as previously mentioned and as shown also in FIG. 6, and the rod 40 of the cylinder 42 is resiliently and slowly moved forward. For these reasons, once a crest 29a of a thread of the internal thread portion 29 enters somewhere in the range A of the thread groove in the buttress thread portion as shown by the dash-dotted contour lines of FIG. 6, then the crest 29a gradually deeply enters the thread groove of the buttress thread portion 1a by rotation of the gauge 27. As a result, threadedly mounting of the internal thread portion 29 on the external thread portion 1a is achieved.

Next, in the above-described state, the internal thread portion 2a of the second member is threadedly fitted into the external thread portion 30 of the gauge 27 in a manner as described hereinafter. First, the state is prepared wherein the solenoid 9 is released so that the lead screw shaft 4 may be moved slightly in its axail direction. Under this state, the motor 21 is actuated to rotate the transmission cylinder 17 through the gears 22 and 20. The rotating force of the transmission cylinder 17 is transmitted to the cylindrical member 12 through the engaging piece 23 and the cylindrical member 12 then rotates. Then, the internal thread member 16 rotated integral therewith is moved forward along the thread grooves. Thus, the cylindrical member 12 is also moved forward. As a consequence, the second member 2 retained on the end of the cylindrical member 12 by the chuck 14 is moved forward while being rotated. Soon, when the end of the tapered thread portion 2a of the second member 2 faces to the end of the external thread portion 30 of the gauge 27, both the threads portions will be threadedly fitted smoothly likewise the aforementioned case where the tapered thread portion 1a and internal thread portion 29 are threadedly fitted. Because a thread of the external thread portion 30 has a contour as described above and the lead screw shaft 4 may be moved slightly in its axial direction. Therefore, the second member 2 can perform forward movement which is smaller or larger in dimension than the amount of feed by the thread groove 5. In the manner as described above, the internal thread portion 29 of the gauge 27 is threadedly fitted into the tapered external thread portion 1a of the first member and tapered internal thread portion 2a of the second member 2 is threadedly fitted into the external thread portion 30 of the gauge 27, as shown in FIG. 5. In this state, the helical locus position of the external thread portion 1a and the helical locus position of the internal thread portion 2a are put in order.

After the above-described state has been assumed, the solenoid 9 is actuated so that the operating lever 10 is pressed against the bottom of the slot 11 to render the lead screw shaft 4 impossible to effect forward and backward movement. Next, the motor 21 is actuated reversely to the first-mentioned case. Then, the second member is rotated in a direction opposite to the case of the threadedly fitting and the second member 2 is disengaged from the gauge 27. Next, the motor 37 is rotated in a direction opposite to the first-mentioned case to rotate the gauge 27 likewise in the opposite direction, and the cylinder 42 is actuated to slowly and resiliently move forward the rod 41 to urge the flange 44 of the gauge 27 in a direction of backward movement (in a right direction as viewed in FIG. 5). Thereby the gauge 27 is disengaged from the first member 1. It will be noted that the work for disengaging the gauge 27 from the first member 1 by the operation as described above can be carried out simultaneously with the work for disengaging the second member 2 from the gauge 27. Subsequently, the cylinder 28 is contracted to move down the retaining frame 31 thereby removing the gauge 27 between the first member 1 and the second member 2.

Next, the motor 21 is normally run while maintaining the solenoid in an operating state to move forward the second memeber 2 while rotating the latter likewise the above-mentioned case. Then, the second member 2 is moved forward in the state wherein the helical locus position of the tapered external thread portion 1a in the first member 1 and helical locus position of the tapered internal thread portion 2a in the second member 2 are being put in order. By further forward movement of the second member, threadedly fitting between the tapered external thread portion 1a and tapered internal thread portion 2a is carried out smoothly (without making the crests of threads bite each other).

Figure 8:
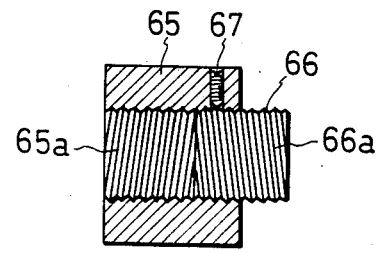
FIG. 8 is a sectional view showing one example of a construction of a guage.
Figure 7:
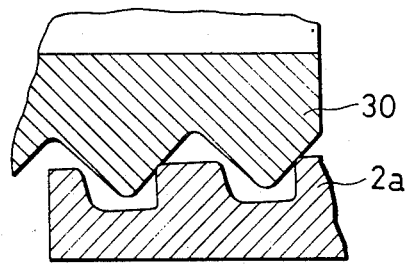
FIG. 7 is an enlarged sectional view showing the threadedly fitted state between an external thread portion of a gauge and an internal thread portion of a coupling.

FIG. 8 shows one example of means for forming an internal thread portion and an external thread portion in a gauge. That is, a cylindrical member 65 formed with internal thread grooves in the internal circumferential surface thereof and a rod-like member 66 formed with external thread grooves in the external circumferential surface thereof are brought into threadedly fitting each other and are fixed by means of a push screw 67. By doing this, it is possible to form a gauge having an internal thread portion 65a and an external thread portion 66a whose helical locus positions are put in order.

Figure 9:
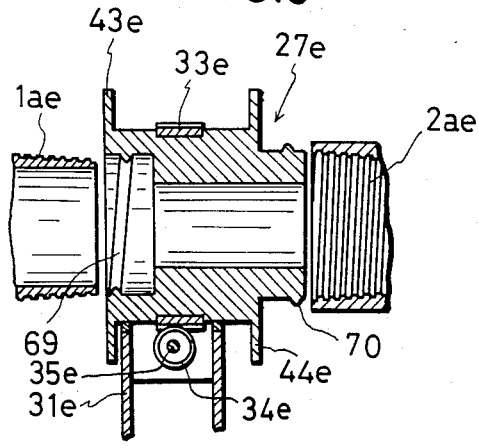
FIG. 9 is a sectional view showing a gauge which is different in construction.

FIG. 9 shows an example of a modified gauge which can be used for the apparatus shown in FIGS. 2 to 5. In this gauge 27e, an internal thread portion 69 has a thread which is shorter (within the range of 360 degrees) than one pitch. An external thread portion 70 likewise has a thread which is shorter (within the range of 360 degrees) than one pitch. The gauge having a thread portion having a thread which is short as described above is much easier in accomplishment of threadedly fitting with respect to the mating buttress thread than that of the above-described embodiment.

Parts, which are contemplated the same as or equal to those shown in the preceding figures in function, are indicated by the same reference numerals as those used in the preceding figures with an alphabet 'e' affixed thereto, and the explanation similar to the foregoing will be omitted (The same is true for the thereafter figures, and alphabets f, g and h are affixed to the previous reference numeral and the explanation similar to the foregoing will be omitted.).

Figure 10:
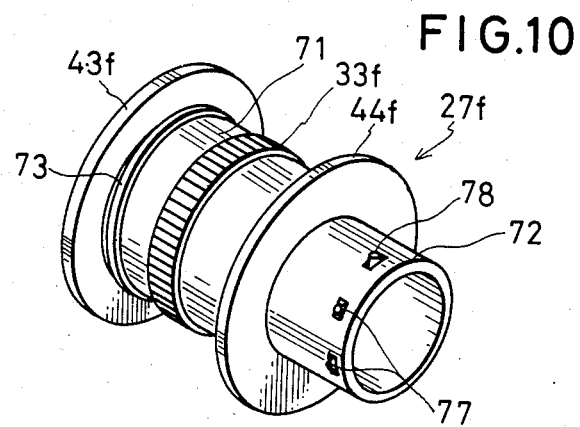
FIG. 10 is a perspective view showing an example of a further modified gauge.
Figure 11:
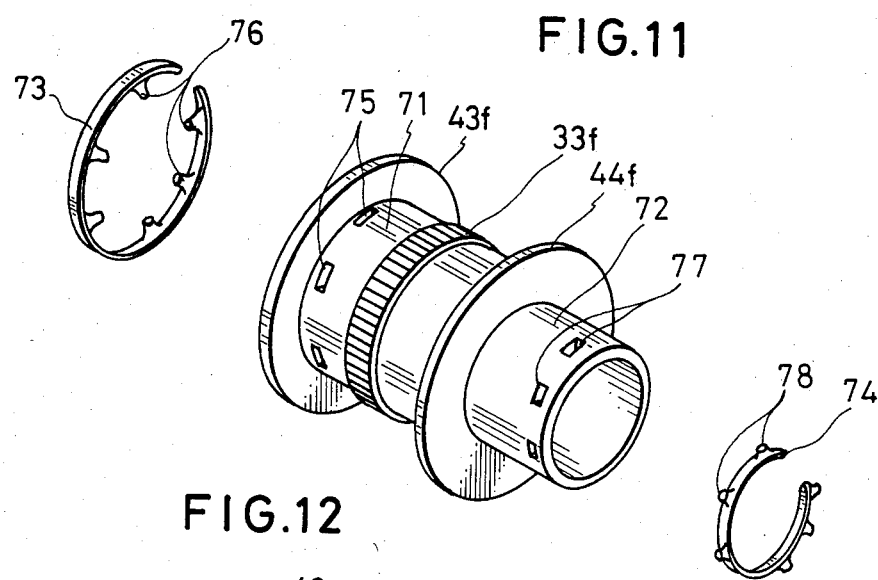
FIG. 11 is an exploded perspective view of the gauge shown in FIG. 10.
Figure 12:
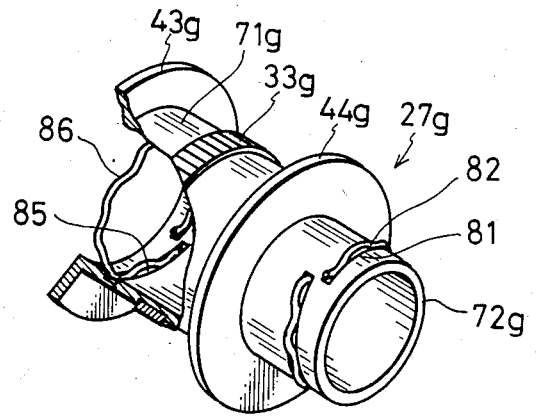
FIG. 12 is a partly broken perspective view showing a still another modified example of a gauge.
Figure 13:
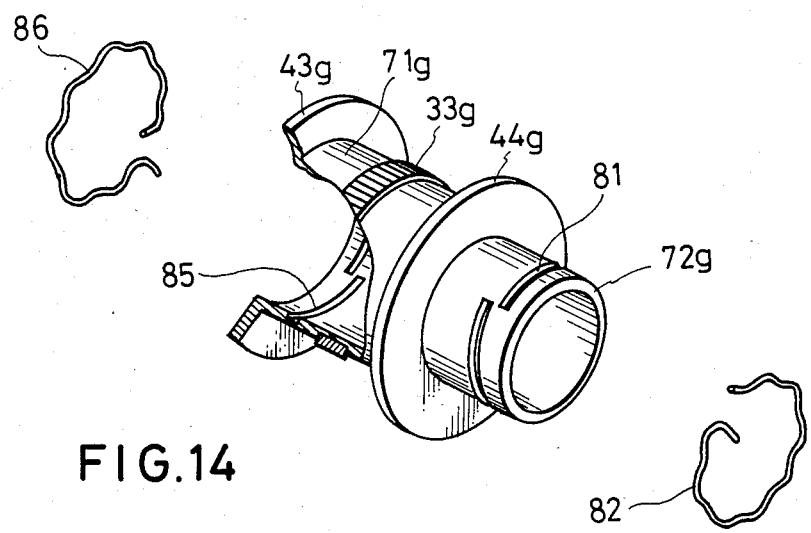
FIG. 13 is an exploded perspective view of the gauge shown in FIG. 12.

FIGS. 10 and 11 show an example of a further modified gauge which can be used for the apparatus shown in FIGS. 2 to 5. This gauge 27f has a cylindrical member 71 having the inside diameter which can be applied to the tapered external thread portion and a cylindrical member 72 having the outside diameter which can be inserted into the tapered internal thread portions, the circlips 73 and 74 are mounted thereon. That is, the cylindrical member 71 is bored with a plurality of through-holes 75 along the same locus as the helical locus of the tapered external thread portion. The circlip 73 has a plurality of projections 76 on the internal surface thereof. The circlip 73 is fitted into the cylindrical member 71 so that the projections 76 may be fitted into the through-holes 75. Thereby the projections 76 which project internally of the cylindrical member 71 from the through-holes 75 have the function similar to the detecting internal thread portion. The cylindrical member 72 is also bored with a plurality of through-holes 77 along the same locus as the helical locus of the tapered internal thread portion. The circlip 74 has a plurality of projections on the external circumference thereof. The circlip 74 is fitted internally of the cylindrical member 72 and the projections 78 are fitted into the through-holes 77. The projections 78 which project from the through-holes 77 have the function similar to that of the detecting external thread portion.

With the construction as described above, where the thread portion (the thread portion formed at the projections 76 and 78 as described above) of the gauge 27f is threadedly fitted into the tapered external thread portion or the tapered internal thread portion, even if the ends of these projections accidentally abut against the crests of thread of the tapered internal thread portion or the tapered external thread portion, the projections 76, 78 may be plunged into the through-holes 75, 77 by the resiliency of the circlips 73, 74. As a consequence, the crests of the threads of the buttress tapered thread portion are prevented from being damged by the projections 76, 78.

Figure 14:
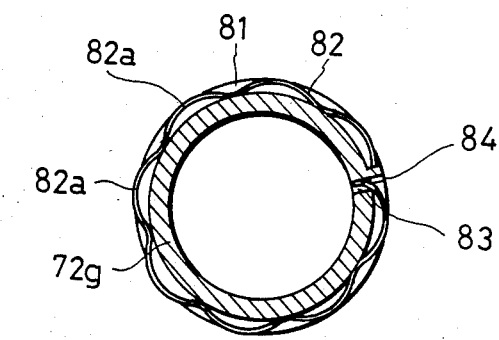
FIG. 14 is a sectional view taken along a thread groove of the gauge shown in FIG. 12.
Figure 15:
FIG. 15 is a side view of a ring member.

Next, FIGS. 12 to 15 show an example of a still another gauge which can be used for the apparatus shown in FIGS. 2 to 5. In a gauge 27g shown in these figures, a helical groove 81 is formed in the external circumference of a cylindrical member 72g, and a ring member 82 is fitted into the helical groove 81. This ring member 82 is waved in a radial direction as shown in FIGS. 14 and 15. In the state wherein the ring is fitted into the groove 81, a number of portions 82a in the form of a waved crest project above the surface of the groove 81. It is noted that the cylindrical member 72g is formed with a through-hole 83, into which one end 84 of the ring member 82 is fitted. As a result, the ring member 82 is prevented from being deviated. On the other hand, the cylindrical member 71g is formed with a helical groove 85 in the internal circumference thereof, and a ring member 86 equal in construction to the ring member 82 is fitted therein.

Figure 16:
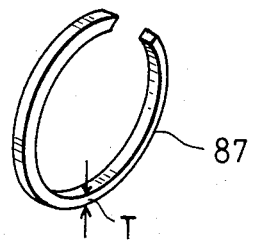
FIG. 16 is a perspective view showing a modified example of the ring body.

With the construction as described above, a portion projected form the groove in each of said ring members acts as a detecting external thread portion or an internal thread portion. These ring members are formed of a material having the resiliency and the portion projected from the groove can be resiliently plunged into the groove. Thus, even is these projected portions should abut against the crest of the thread of the mating buttress thread, said crest is prevented from being damaged. It will be noted that as the aforesaid ring member, a ring member 87 which has a contour as shown in FIG. 16 and has a thickness T larger than the depth of the groove can be used and fitted into each of said helical grooves 81 and 85.

FIG. 17 shows a modified contour of a thread of the detecting external thread portion or the internal thread portion in the gauge. In FIG. 17, a thread 91 is formed to be rectangular (a trapezoid can be employed) as shown, and a flank thereof is formed with cuts 92, 92. These cuts 92 are formed lengthy along the thread 91. The thread 91 is formed of a material having the resiliency and flexibility such as synthetic resin materials.

In the gauge having the thread 91 as described above, where it is threadedly fitted into the buttress external thread or internal thread, even if the helical locus positin of the buttress thread portion and the helical locus position of the detecting thread portion in the gauge are not put in order, threadedly fitting can be effected smoothly likewise the above-described case. That is, even if a shoulder of a thread 93 of the buttress thread portion and a shoulder of the thread 91 in the gauge should abut against each other as shown, a shoulder 91a of the thread 91 is flexed as indicated by arrow 94 and the thread 91 may slide into the thread groove of the buttress thread portion as indicted by arrow 95. Also in this case, since the thread 91 is formed of a material as described above, it is possible to prevent the thread 93 in the buttress thread portion from being damaged.

Figure 18:
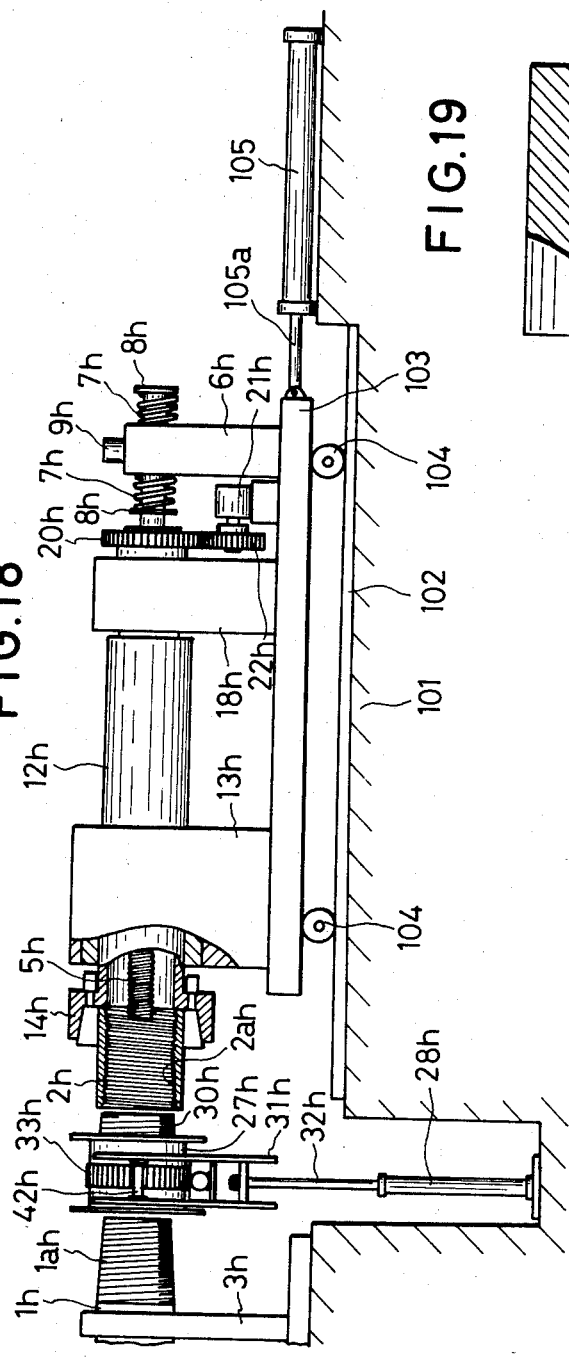
FIG. 18 is a view showing the whole structure of a further modified threadedly fixing apparatus.

FIG. 18 shows another embodiment of the threadedly fixing apparatus.

The apparatus shown in FIG. 18 mostly has the same construction as that of the apparatus shown in FIGS. 2 to 5 but a part thereof is different. The different part will be described hereinafter.

A rail 102 is laid on a floor 101 and a vehicle 103 having wheels 104 is moved on the rail 102. A supporting bed 6h and receiving beds 13h, 18h are mounted on the vehicle 103. A hydraulic cylinder 105 as movement means for moving the vehile 103 forward and backward is mounted on the floor 101. A piston rod 105a of the hydraulic cylinder 105 is connected to the vehicle 103. The moving direction of the vehicle 103 is parallel to the axial direction of a cylindrical member 12h of a device which sits on the vehicle 103. It will be noted that the means for moving the vehicle 103 forward and backward can be a hydraulic motor or an electric motor.

Threadedly fixing work by the apparatus as constructed above is carried out substantially similarly to that shown in FIGS. 2 to 5 except the following:

(1) Where an internal thread portion 2ah of a coupling 2h is threadedly fitted into an external thread portion of a gauge 27h:

In this case, the vehicle is first moved by the cylinder 105 so that the internal thread portion 2ah comes very close to the external thread portion 30h. Next, a motor 21h is actuated to move forward the cylindrical member 12h while rotating the latter whereby the internal thread portion 2ah is threadedly fitted into the external thread portion 30h.

(2) Where a helical locus position of an external thread portion 1ah of a pipe 1h and a helical locus position of the internal thread portion 2ah of the coupling 2h are put in order, after which the internal thread portion 2ah is threadedly fitted into the external thread portion 1ah:

In this case, the vehicle is first moved by the cylinder 105 so that the internal thread portion 2ah comes very close to the external thread portion 1ah. Said moving distance is made to be an integral fold of the pitch of the internal thread portion 2ah. Next, the motor 21h is actuated to move forward the cylindrical member 12h while rotating the latter whereby the internal thread portion 2ah is threadedly fitted into the external thread portion 1ah.

When work is carried out by using the cylinder 105 to make the internal thread portion 2ah come close to the external thread portion 30h or 1ah, that work can be effected very rapidly.

Figure 19:
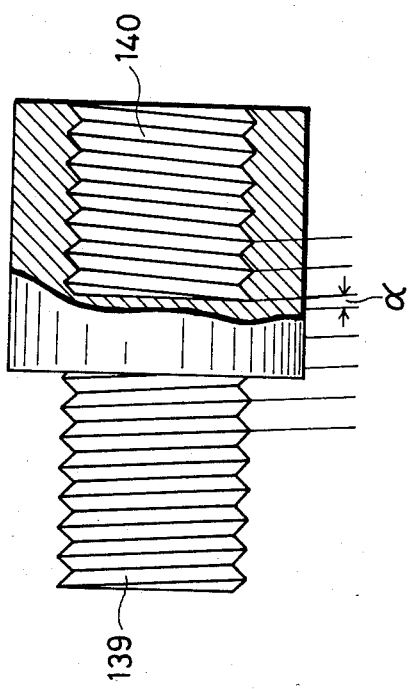
FIG. 19 is a partly broken view showing a gauge in which a helical locus position of the external thread portion and a helical locus position of the internal thread portion are not put in order.

Next, in the above-constructed apparatus, even if the helical locus position of the external thread portion in the gauge and the helical locus position of the internal thread portion are not put in order, that is, even if there is present a deviation α between the helical locus position of an external thread portion 139 and the helical locus position of an internal thread portion 140 as shown in FIG. 19, threadedly mounting between a pipe and a coupling by operation as described above using the gauge may be carried out without trouble.

The operation where the gauge is used can be carried out in the following manner. That is, where in threadedly mounting the internal thread portion 2ah of the coupling 2h on the external thread portion 1ah of the pipe 1h, the vehicle 103 is moved forward by the cylinder 105, the distance of said forward movement is set to the distance obtained by adding the value of the aforesaid deviation α to the integral fold of the pitch of the external thread portion 2ah in the coupling 2h. By doing this, when the vehicle 103 has been moved forward, the helical locus position of the internal thread portion 2ah and the helical locus position of the external thread portion 1ah are put in order. Other operations can be carried out exactly in the same manner as that of the previous case.

As many apparently widely different embodiments of this invention may be made without departing from the spirit and scope thereof, it is to be understood that the invention is not limited to the specific embodiments thereof except as defined in the appended claims.

What is claimed is:

1. A threaded fixing apparatus including:
   (a) a retaining means for retaining a first member having a buttress tapered thread portion;
   (b) a retaining means for retaining a second member having a tapered thread portion to be threadedly fitted into the tapered thread portion of said first member;
   (c) a gauge having a detecting thread portion threadedly fitted into the tapered thread portion of said first member to detect a helical locus position thereof and a further detecting threaded portion threadedly fitted into the tapered thread portion of said second member to detect a helical locus position thereof; and
   (d) a means for relatively turning said first and second members to threadedly mount the tapered thread portions of both the members together in the state wherein the helical locus positions of both the thread portions coincide on the basis of the helical locus positions of said both tapered thread portions detected by said gauge;
   (e) said detecting thread portion to be threadedly fitted into the tapered thread portion of said first member being formed such that it may be threadedly fitted into the tapered thread portion of said first member more readily than the case where the tapered thread portion of said second member is threadedly fitted into the tapered thread portion of said first member;
   (f) said detecting thread portion to be threadedly fitted onto the tapered thread portion of said second member being formed such that it may be threadedly fitted onto the tapered thread portion of said second member more readily than the case where the tapered thread portion of said first member is threadedly fitted onto the tapered thread portion of said second member.

2. The threadedly fixing apparatus according to claim 1 wherein both the detecting thread portions in said gauge comprise a triangular thread.

3. The threadedly fixing apparatus according to claim 1 wherein
   (a) said threadedly mounting means includes
      (i) a cylindrical member rotatably supported by a receiving bed and supported movably forward and backward in an axial direction on the same shaft as that of said first member;
      (ii) a driving means for rotating said cylindrical member;
      (iii) a lead screw shaft supported by a supporting bed movably forward and backward in said axial direction and having a feeding external thread portion of the same pitch as that of said tapered thread portion;
      (iv) a means for tightly or loosely securing said lead screw shaft to said supporting bed; and
      (v) an internal thread member fixed to said cylindrical member and threadedly fitted into the feeding external thread portion of said lead screw shaft;
   (b) said retaining means for retaining said second member comprises a chuck mounted on the end of said cylindrical member.

4. The threadedly fixing apparatus according to claim 1 wherein
   (a) said threadedly mounting means includes
      (i) a vehicle capable of being moved forward and backward in a direction parallel to the shaft of said first member on a floor;
      (ii) a means for moving said vehicle forward and backward;
      (iii) a cylindrical member rotatably disposed on said vehicle and disposed movably forward and backward in the axial direction on the same shaft as that of said first member;
      (iv) a driving means for rotating said cylindrical member;
      (v) a lead screw shaft disposed on said vehicle movably forward and backward in said axial direction and having a feeding external thread portion of the same pitch as that of said tapered thread portion;
      (vi) a means for tightly or loosely securing said lead screw shaft to said vehicle; and
      (vii) an internal thread member fixed to said cylindrical member and threadedly fitted into the feeding external thread portion of said lead screw shaft;
   (b) said retianing means for retaining said second member comprises a chuck mounted on the end of said cylindrical member.

5. The threadedly fixing apparatus according to claim 4 further including a retaining means for retaining said gauge between the first member and the second member, said retaining means including:
 (i) a lift which is movable up and down;
 (ii) a retaining frame mounted on said lift so that in the elevated state of the lift, the gauge may be retained in the state coaxial with said first and second members and rotatably and axially movably forward and backward;
 (iii) a rotating means for normally and reversely rotating said gauge; and
 (iv) a movement control mechanism for controlling the forward and backward movement of said gauge.

* * * * *